United States Patent [19]
Nishii et al.

[11] Patent Number: 5,119,214
[45] Date of Patent: Jun. 2, 1992

[54] METHOD FOR FORMING A COMPUTER GENERATED HOLOGRAM

[75] Inventors: Kanji Nishii, Osaka; Hiroyuki Kawamura, Kadoma; Masami Itoh, Takarazuka; Atsushi Fukui, Hirakata, all of Japan

[73] Assignee: Matsushita Electric Industrial Co., Ltd., Osaka, Japan

[21] Appl. No.: 675,526

[22] Filed: Mar. 26, 1991

[30] Foreign Application Priority Data

Mar. 26, 1990 [JP] Japan .................................. 2-76028

[51] Int. Cl.$^5$ ............................................. G03H 1/08
[52] U.S. Cl. ........................................ 359/7; 359/9; 359/21
[58] Field of Search .................... 350/3.62, 3.64, 3.66, 350/3.74, 348, 162.12, 162.13

[56] References Cited

U.S. PATENT DOCUMENTS

| | | |
|---|---|---|
| 3,510,223 | 5/1970 | Lohmann . |
| 3,666,359 | 5/1972 | Lee . |
| 3,744,878 | 7/1973 | Kiemle et al. . |
| 3,744,879 | 7/1973 | Beard et al. . |
| 4,138,190 | 2/1979 | Bryngdahl ............... 350/162.15 |
| 4,838,644 | 6/1989 | Ochoa et al. .............. 350/162.13 |
| 4,892,370 | 1/1990 | Lee ........................... 350/162.13 |

Primary Examiner—Bruce Y. Arnold
Assistant Examiner—Martin Lerner
Attorney, Agent, or Firm—Wenderoth, Lind & Ponack

[57] ABSTRACT

New methods for producing computer generated holograms to be used for a liquid crystal spacial light modulator having a plurality of pixels, wherein the amplitude component of a coherent wave disturbance is corrected by taking into account the phase distortion due to the twist of liquid crystal molecules of the liquid crystal spacial light modulator.

2 Claims, 13 Drawing Sheets

$0 < V_s < V_{max}$

Fig. 3(c)

$V_s = V_{max}$

METHOD FOR FORMING A COMPUTER GENERATED HOLOGRAM

BACKGROUND OF THE INVENTION

1. Field of the Invention

The present invention relates to a method for forming a computer generated hologram to be used for optical information processing by displaying the computer generated hologram with a liquid crystal spatial light modulator.

2. Description of Related Art

Holography is a technique of three-dimensional optical image formation for recording, and later reconstructing, the amplitude and phase distributions of a coherent wave disturbance. A hologram is a photographic recording obtained by recording the interference fringes between the waves reflected from an object and the mutually coherent waves called the reference light from the same laser.

A computer generated hologram is optical information in the form of the digital data of the above-mentioned amplitude and phase distributions of a coherent wave distributions at a position for recording, and it is obtained by computer simulation on the basis of wave optics. Such a computer generated hologram is used to display an optical image with use of a liquid crystal spatial light modulator. In other words, an electric voltage applied to each pixel of the liquid crystal spatial light modulator is controlled according to the data of computer generated hologram so as to modulate spatially the transmittance or the reflectance of pixels.

In a layer of twisted nematic type liquid crystal of a spatial light modulator, the longer molecular axes of liquid crystal molecules are twisted by 90° from the incident side to the outgoing side, and the polarization of the linearly polarized, incident light is rotated along the longer molecular axes of liquid crystal molecules. By applying an electric voltage to the liquid crystal molecule layer, the twist of the liquid crystal molecules decreases, and the twist of the polarizing direction decreases so that the transmittance of the liquid crystal molecule layer vary with the applied electric voltage. Thus, the transmittance is modulated spatially by controlling the applied electric voltage.

However, when the amplitude component of the incident light is modulated by controlling the applied electric voltage, the length of optical path of the transmitting or reflecting light varies with the transmittance or the twist of liquid crystal molecules according to the applied electric voltage. Therefore, the phase distortion is caused by the optical path difference between pixels divided by the wavelength of the incident light, and the phase distortion varies with the applied electric voltage. If such a phase distortion arises in optical information processing in a coherent optical system wherein both amplitude and phase of light are processed, the modulation of the amplitude component of light accompanies inevitably an undesirable change in the phase component. Thus, required optical information processing cannot be carried out by using a liquid crystal spatial light modulator.

SUMMARY OF THE INVENTION

It is an object of the present invention to provide a method for producing a computer generated hologram for display with a liquid crystal spatial light modulator, which computer generated hologram not being affected by the phase distortion.

A first method according to the present invention for producing a computer generated hologram to be used for a liquid crystal spatial light modulator having a plurality of pixels to be controlled open completely or to close completely, wherein a cell being composed of a plurality of pixels is a unit for displaying the amplitude component and the phase component of a coherent wave disturbance, and a cell may have an aperture composed of pixels adjacent to each other to express the amplitude and phase components, the amplitude component for a cell being expressed by the area of the aperture, the phase component being expressed by the distance of the aperture from the center of the cell, comprises the steps of: (a) calculating the amplitude component and the phase component for each cell; (b) adding the phase distortion component to the phase component by using experimental data of phase distortion of a pixel; and (c) determining the center of the aperture in each cell according to the result of the adding step and the area of the aperture according to the amplitude component.

A second method according to the present invention for producing a computer generated hologram to be used for a liquid crystal spatial light modulator having a plurality of pixels to be controlled to change the transmittance of liquid crystal layer continuously, wherein a cell being composed of a linear array of pixels is a unit for displaying the amplitude component and the phase component of a coherent wave disturbance, the phase component being expressed as the position of a pixel assigned to the phase in the linear array of pixels, the amplitude component in correspondence with the phase component being expressed as the amount of transmitted light in said pixel assigned to the phase, comprises steps of: (a) calculating the amplitude component and the phase component in a cell; (b) estimating the phase distortion in each cell according to the amplitude component data obtained in the calculating step by using experimental data of phase distortion of a pixel; and (c) correcting the amplitude component and the phase component by adding the phase distortion to the phase component.

It is an advantage of the present invention that a computer generated hologram for display with a liquid crystal spatial light modulator without the effect of the phase distortion can be produced.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Embodiments of the present invention will be explained below with reference to the accompanying drawings. First, the phase distortion when a computer generated hologram is displayed with a liquid crystal spatial light modulator will be explained.

Figure 1:
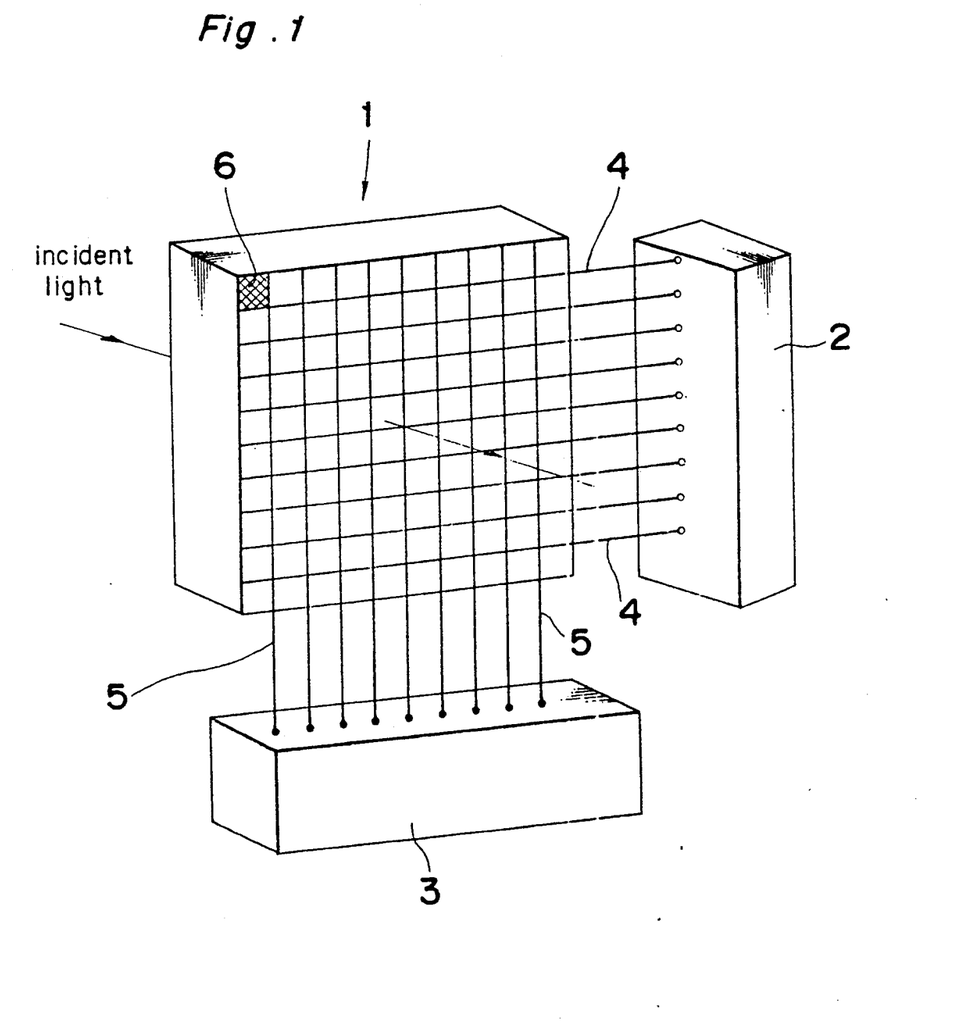
FIG. 1 is s schematic perspective view of a liquid crystal spatial light modulator and the driving part thereof.

FIG. 1 shows an example of a liquid crystal spatial light modulator and its driver. A liquid crystal spatial light modulator 1 is composed of a plurality of pixels 6 arranged as a two-dimensional matrix. A driver of the liquid crystal spatial light modulator 1 consists of a first part 2 for applying signal electric voltages and a second part 3 for applying pixel selection electric voltages. The first part 2 and the second one 3 are connected to the X electrode lines 4 and the Y electrode lines 5, respectively.

Figure 2:
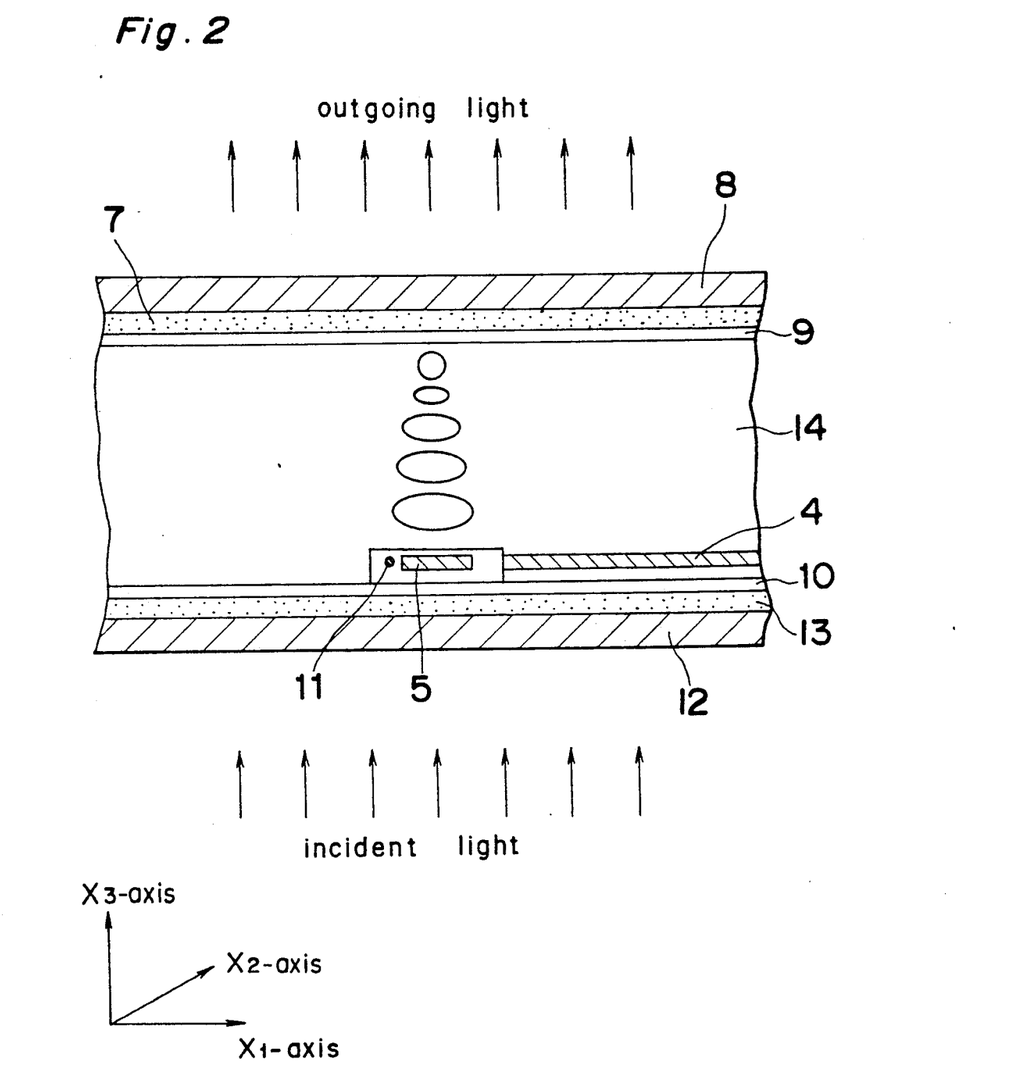
FIG. 2 is a schematic sectional view of a pixel of the liquid crystal spatial light modulator.

FIG. 2 shows a section of a pixel 6 of the liquid crystal spatial light modulator 1. A first transparent electrode 9 and a second transparent electrode 10 are applied to a first glass substrate 7 and a second glass substrate 13, respectively, and twisted nematic type liquid crystal is filled between the two transparent electrodes 9, 10 to form a liquid crystal molecule layer 14. A switching element 11 is formed for each pixel 6 on the second transparent electrode 10, and it is connected to an X electrode line 4 and a Y electrode line 5. An analyser 8 and a polarizer 12 are arranged outside the substrates 7, 13 in the parallel Nicol state. Light is incident on the side of the polarizer 12 and is outgoing on the side of the analyzer 8. As shown in FIG. 2 schematically, liquid crystal molecules of elliptic shape are aligned so that their longer molecular axes are twisted by 90° from the incident side to the outgoing side.

The liquid crystal spatial light modulator 1 is driven as follows. The light incident on the liquid crystal light modulator 1 is converted to a linearly polarizing light in the $X_1$ direction by the polarizer 12 to come into the liquid crystal molecule layer 14. The linearly polarized incident light has optical rotator power that the polarization is rotated along each longer molecule axis of liquid crystal molecules in the layer 14. Because the liquid crystal molecules are twisted by 90° in the layer 14, the linearly polarized light in the $X_1$ direction is converted to the linearly polarized light in the $X_2$ direction in the outgoing side if no driving voltage is applied to the pixel 6. On the other hand, because the analyser 8 and the polarizer 12 are arranged in the parallel Nicol state, the outgoing light from the pixel 6 to which no electric voltage is applied is absorbed by the analyser 8.

Next, the driving method of the pixels 6 of the liquid crystal spatial light modulator 1 is explained below. The liquid crystal light modulator 1 is composed of a plurality of pixels 6 arranged as a two-dimensional matrix. In order to drive a specified pixel among the pixels 6, the first part 2 and the second one 3 apply a pixel selection signal (not shown) and a signal voltage $V_s$ (not shown) to the switching element 11 of the specified pixel via the corresponding X and Y electrode 4, 5, respectively.

Figure 3A:
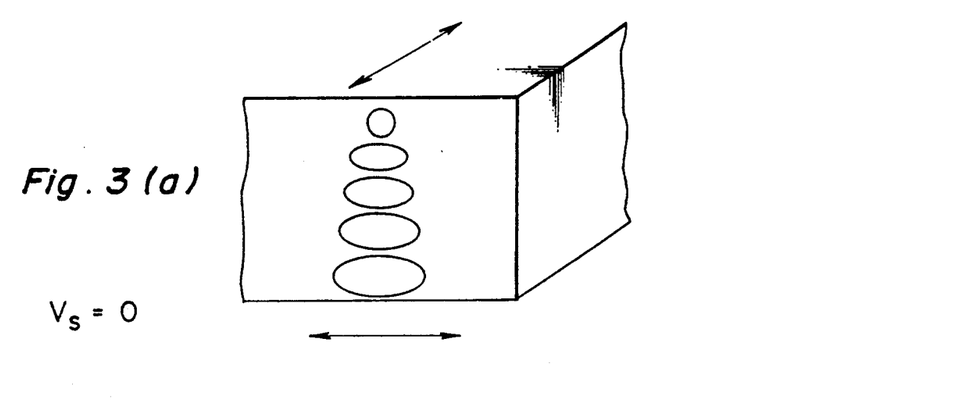
FIGS. 3(a), 3(b) and 3(c) are schematic diagrams of the change in the alignment of liquid crystal molecules according to the applied driving voltage.
Figure 3B:
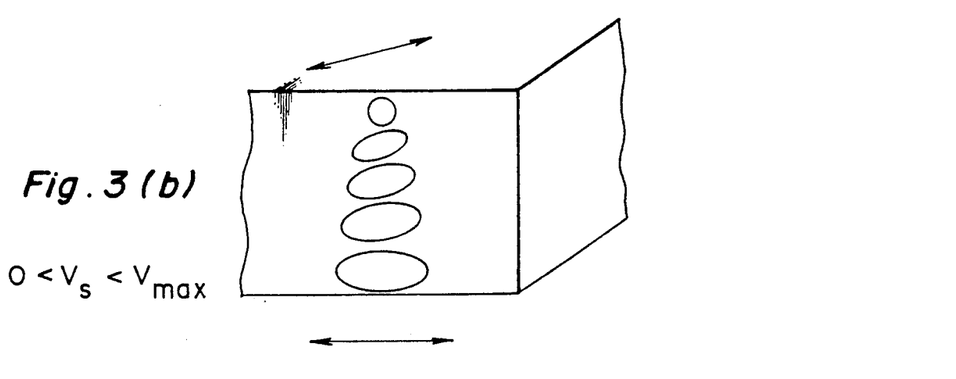
Figure 3C:
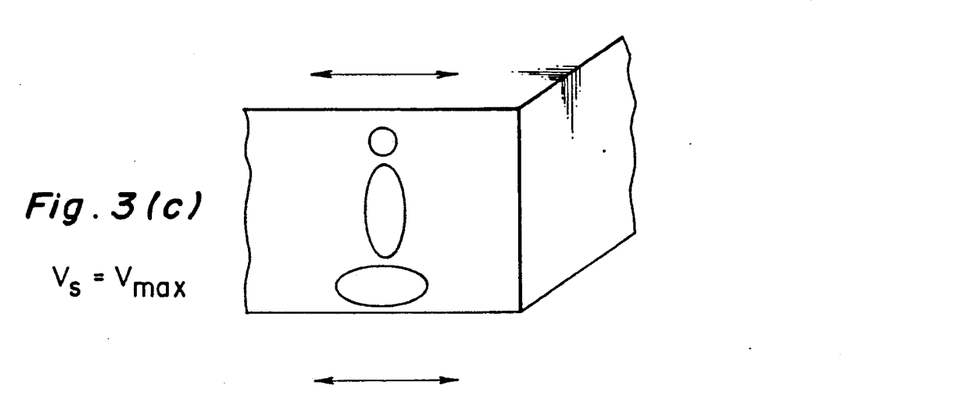

If the signal voltage is zero, the polarizing direction of the incident light is perpendicular so that of the outgoing light because liquid crystal molecules are twisted by about 90° in the layer 14, as shown in FIG. 3(a). If the signal voltage $V_s$ is increased, the twist of the polarizing direction decreases, as shown in FIG. 3(b). If the maximum electric voltage $V_{max}$ is applied, the polarizing direction of the outgoing light becomes parallel to that of the incident light, as shown in FIG. 3(c), so that the light incident to the analyzer 8 goes out, while not absorbed by the analyzer 8.

Figure 4:
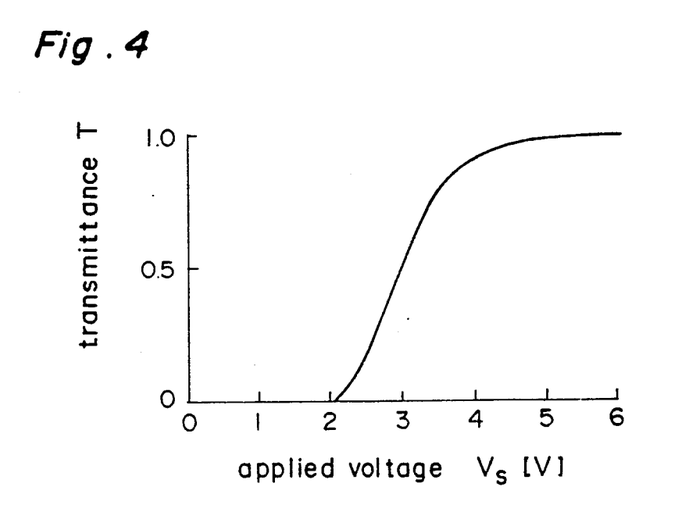
FIG. 4 is a graph of the transmittance plotted against the applied electric voltage.

FIG. 4 shows an example of a relation of the transmittance T of a liquid crystal spatial light modulator 1 with the signal voltage $V_s$ for driving (hereinafter referred to as V-T characteristic). The transmittance T can be modulated spatially for each unit by controlling the magnitude of the signal voltage to be applied to a pixel 6 of the liquid crystal special light modulator 1.

Figure 5:
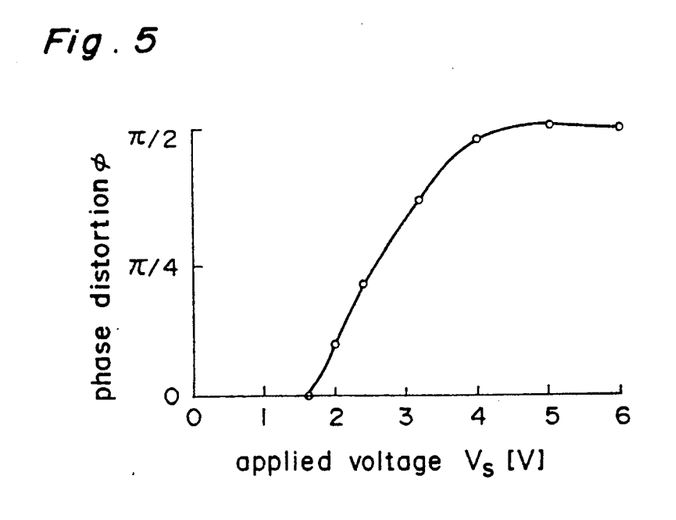
FIG. 5 is a graph of the phase distortion plotted against the applied electric voltage.

However, the alignment of liquid crystal molecules changes by changing the applied electric voltage $V_s$ on modulation, so that the optical path of the transmitting or reflecting light in a pixel changes according to a change in the applied voltage $V_s$ or in the transmittance. Therefore, the phase distortion obtained as the difference in optical paths between pixels 6 varies with the transmittance as shown in FIG. 5. In optical information processing in a coherent optical system, both amplitude and phase have to be controlled. However, if a computer generated hologram is used to display an image, the modulation of the amplitude component accompanies an undesirable change in the phase component shown in FIG. 5.

This undesirable phase component can be corrected by methods according to the present invention, as will be described below.

EXAMPLE 1

Figure 6:
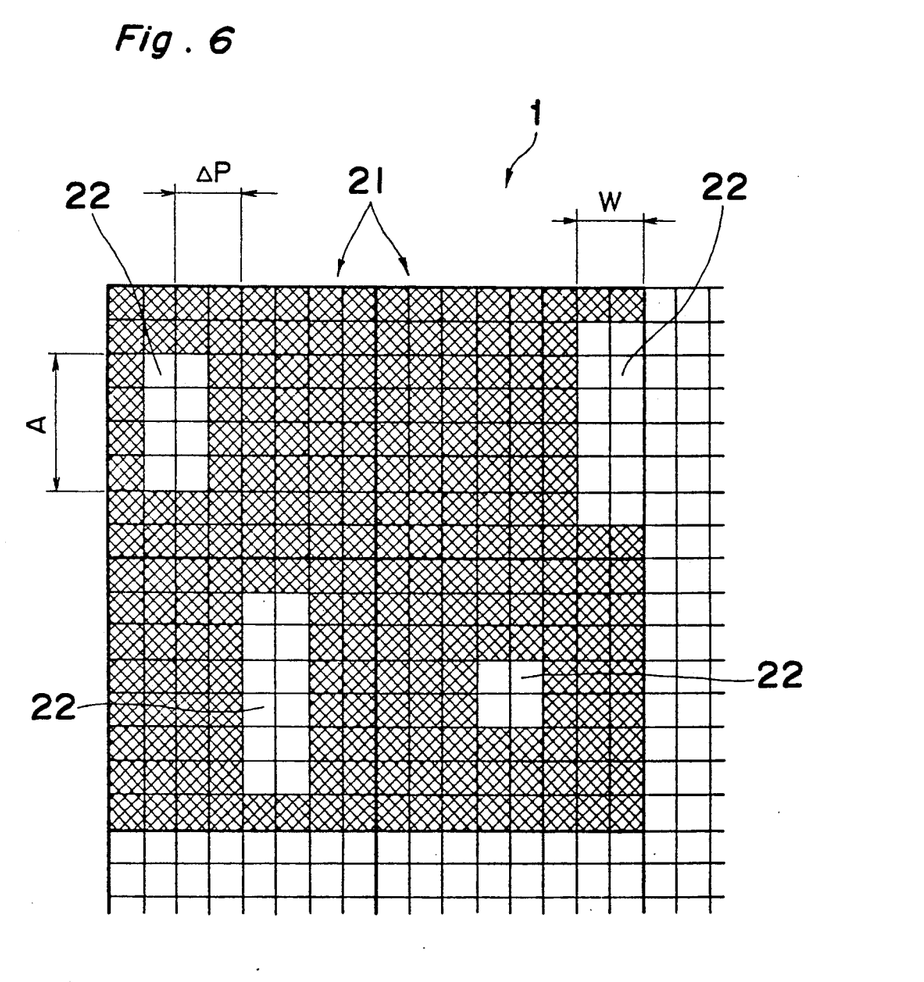
FIG. 6 is a diagram of a Lohmann type computer generated hologram.
Figure 7:
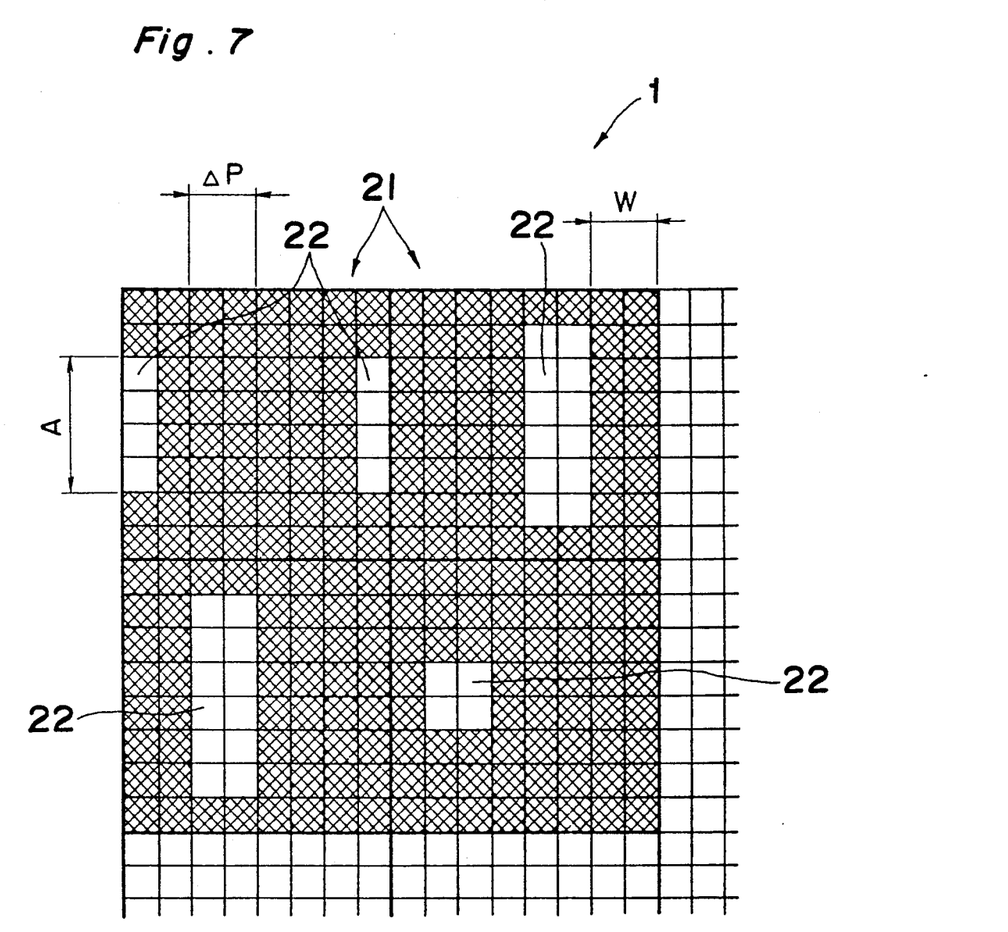
FIG. 7 is a diagram of a computer generated hologram of Example 1 corrected for the phase distortion.

A first example of a method for forming a computer generated hologram is explained below with reference to FIG. 6, which shows the structure of a computer generated hologram called generally a Lohmann type. A cell 21 consists of m n (8 8 in this example) of pixels 6 of a liquid crystal spatial light modulator 1. A reference numeral 22 represents an aperture located in a cell 21. In a cell 21, the transmittance of the pixels 6 in the aperture 22 is one, whereas that of the other pixels 6 displayed with crossed hatch lines is zero. The amplitude component for a cell 21 is expressed as the area of an aperture 22. Because the width W of an aperture 22 is taken as constant, the amplitude component is expressed by the height A of the aperture 22. On the other hand, the phase component $\Psi$ is expressed as a distance $\Delta P$ of the center of the aperture 22 from the center of a cell 21 in the horizontal direction. Thus, the phase component $\Psi$ is expressed by the following equation:

$$\Psi = 2\pi(\Delta P/m) \qquad (1)$$

wherein $-\pi \leq \Psi < \pi$ and m designates the number of pixels corresponding to the distance between the centers of the aperture 22 and of the cell 21. In other words, the distance $\Delta P'$ is expressed by the following equation:

$$\Delta P = m\Psi/2\pi \qquad (2)$$

As explained above, in a Lohmann type computer generated hologram, a cell 21 is composed of a plurality of pixels 6, and a pixel 6 in a liquid crystal spatial light modulator 1 is controlled to transmit or reflect light completely or not. The amplitude component is expressed as the area of an aperture 22 in a cell 21, while the phase component is expressed as the position of the cell in a direction; the pixels 6 belonging to an aperture 22 is controlled to transmit light completely.

If a Lohmann type computer generated hologram is constructed by using $\Psi$ obtained only by the calculation of wave optics, and such a computer generated hologram is displayed in the liquid crystal spatial light modulator 1, the phase distortion explained above with reference to FIG. 5 arises owing to the modulation of the transmittance of the pixels in an aperture 22 by applying a signal voltage to the pixels 6 so as to make the transmittance one.

In this example, in order to remove such a phase distortion, another phase distortion $\phi$ which arises from in the pixels 6 owing to the change in the optical path of the transmitting or reflecting light is added to the phase component $\Psi$. That is, the distance $\Delta P$ for the phase component is calculated as follows:

$$\Delta P = m(\Psi + \phi)/2\pi \qquad (3)$$

The phase distortion $\phi$ is $\pi/2$ as shown in FIG. 5. Thus, the position of the pixels for displaying the phase component is changed according to the corrected distance $\Delta P$ of Equation (3).

By using such a computer generated hologram for a liquid crystal spatial light modulator 1, the deterioration of a reproduction image of the computer generated hologram caused by the phase distortion in the pixels can be prevented. Therefore, good coherent holographic optical information processing can be realized.

EXAMPLE 2

A method for forming a computer generated hologram called in general a Lee type will be explained below with reference to FIGS. 7–14.

Figure 8:
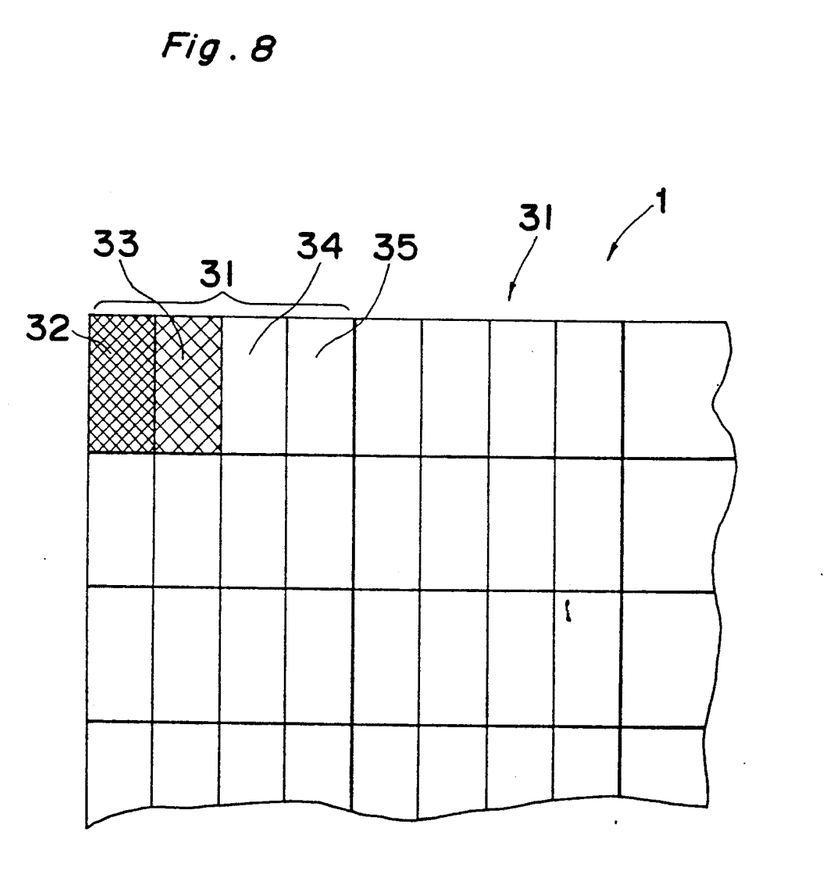
FIG. 8 is a diagram of a Lee type computer generated hologram.

FIG. 8 shows the structure of a computer generated hologram of Lee type, wherein a cell 31 consists of arrays 31 in the horizontal direction. An array 31 has four pixels 31, 32, 33 and 34 in the horizontal direction and displays the amplitude and phase components of a Lee type computer generated hologram expressed in Equation (4).

$$g = (a_1 + a_2) + i(b_1 + b_2), \qquad (4)$$

wherein g is a complex transmittance function of the Lee type computer generated hologram in a coherent optical system, $a_1$ is the positive real part of g, $a_2$ is the negative real part of g, $b_1$ is the positive imaginary part of g, and $b_2$ is the negative imaginary part of g.

In other words, $a_1$ is the amplitude component at phase $\Psi = 0$, $a_2$ is the amplitude component at phase $\Psi = \pi$, $b_1$ is the amplitude component at phase $\Psi = \pi/2$, and $b_2$ is the amplitude component at phase $\Psi = 3\pi/2$. Then, the display of this Lee type computer generated hologram with the liquid crystal spatial light modulator 1 is carried out by modulating the amplitude transmittance in correspondence with the amplitude component for each pixel 32-35 assigned for the phase component $\Psi(= 0, 2/\pi, \pi, 3\pi/2)$, as will be explained with FIG. 9.

As explained above, in a Lee type computer generated hologram, a cell is composed of a linear array 31 of pixels. A pixel 6 in a liquid crystal spatial light modulator 1 is controlled to change the transmittance so as to express gradation. The positions of the pixels in an array 31 represent the phase component, while the amplitude component is expressed as the transmittance of the pixels, that is, as the amplitude transmittance $Ta_1$, $Ta_2$, $Tb_1$ and $Tb_2$ defined as the projections of the complex transmittance function to the $a_1$, $a_2$, $b_1$ and $b_2$ axes as shown later in FIG. 9.

Figure 9:
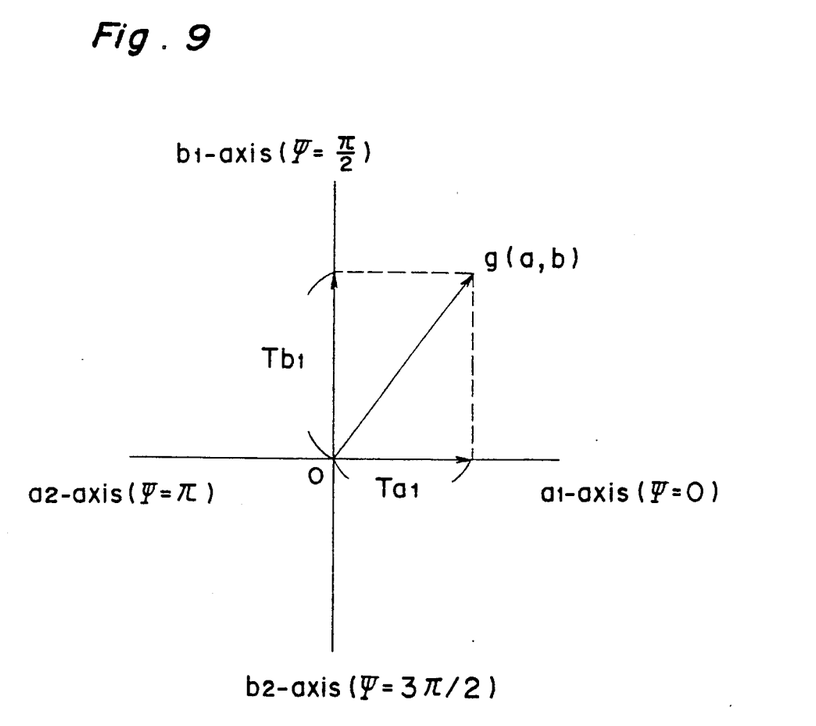
FIG. 9 is a graph of a complex transmittance function g(a,b) of a computer generated hologram in a complex plane.

FIG. 9 shows a vector of complex transmittance function g in a complex plane. The complex transmittance function expressed as g(a,b) is decomposed into two axes, $a_1$–axis ($\Psi = 0$) and $b_1$–axis ($\Psi = \pi/2$), and the components, $Ta_1$ and $Ta_2$, along the two axes are defined as the amplitude transmittance in correspondence with $a_1$ and with $a_2$ shown in FIG. 8, respectively.

Figure 10:
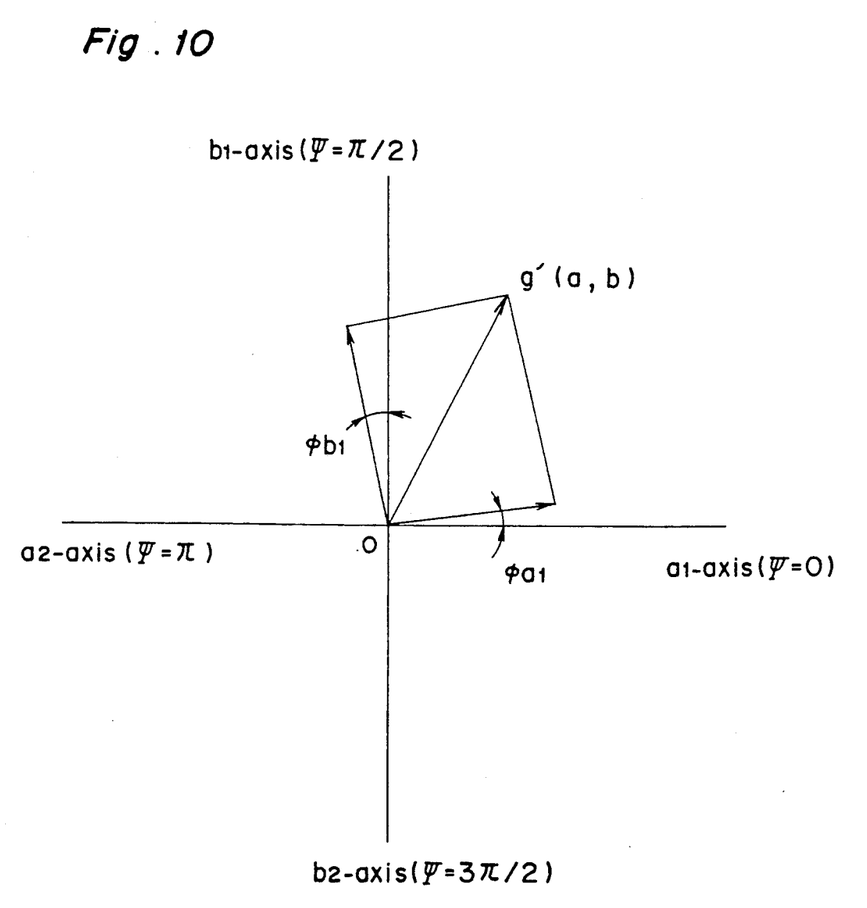
FIG. 10 is a graph of a complex transmittance function g'(a,b) including the phase distortion of a computer generated hologram.

If a Lee type computer generated hologram is constructed by using the complex transmission function g obtained only by the calculation of wave optics, and if such a computer generated hologram is displayed in the liquid crystal spatial light modulator 1, the phase distortion explained above with reference to FIG. 5 arises owing to the modulation of the transmittance of the apertures 32-35 as in Example 1. Because the transmittance is controlled to express gradation in a Lee type computer generated hologram, the phase distortion also changes the gradation. FIG. 10 shows the complex transmittance function g'(a,b) including the phase distortions $\phi a_1$ and $\phi b_1$ which arise in the transmission through liquid crystal molecules.

Figure 11:
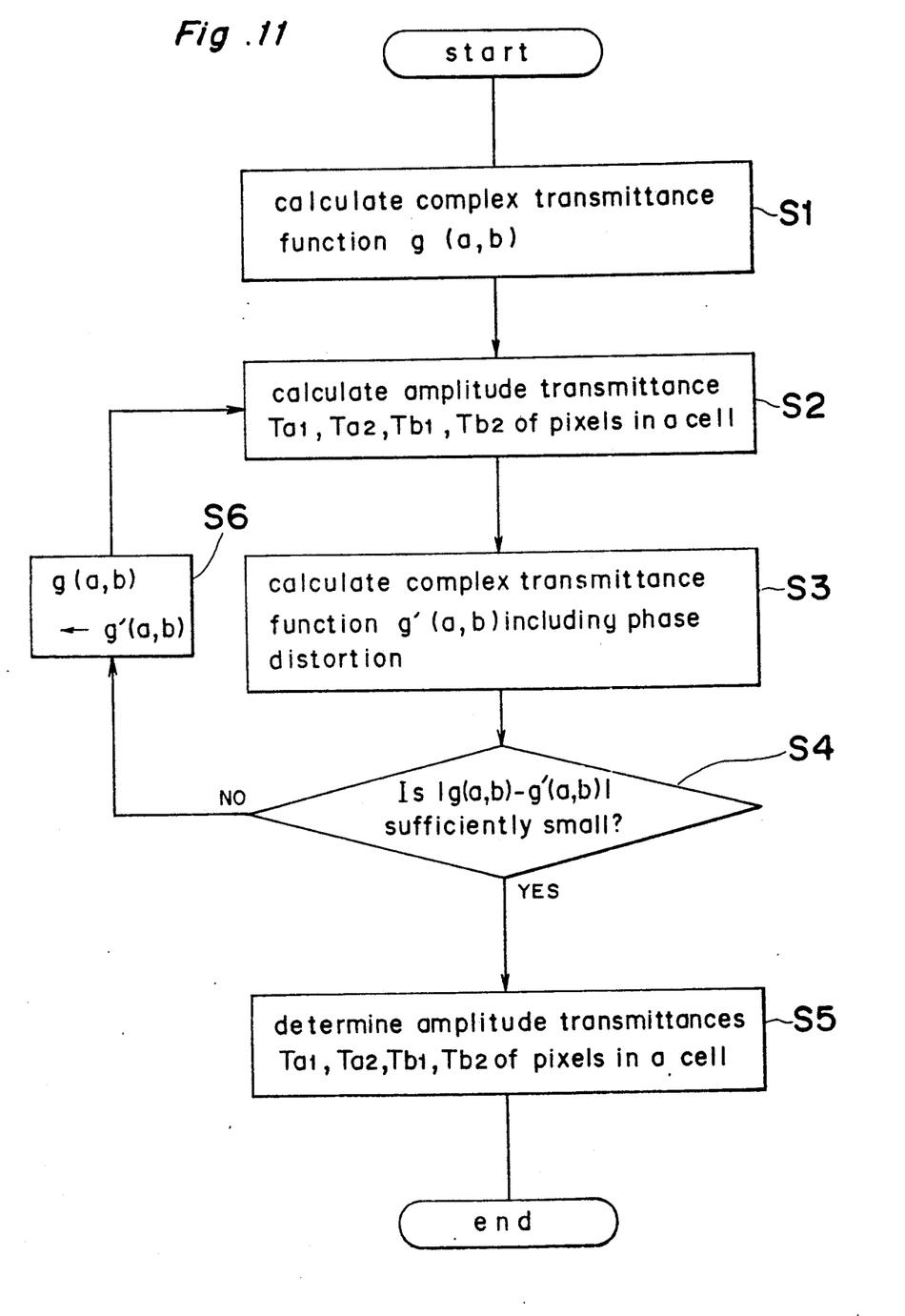
FIG. 11 is a flowchart of producing a computer generated hologram of Example 2.

FIG. 11 shows a flow of calculating the complex transmittance function g'(a,b) for constructing a computer generated hologram. First, a complex transmittance function g(a,b) is calculated (step S1), from a desired image G(x,y) to be reproduced from the computer generated hologram:

$$g(a,b) = \int \int G(x,y) \exp(-2\pi i(ax + by))dxdy. \qquad (5)$$

Then, g(a,b) is expanded in a form of $$g(a,b) = (a_1 + a_2) + i(b_1 + b_2), \qquad (6)$$

wherein $$\begin{aligned}
a_1 &= |g(a,b)|\cos\psi, & \text{if } \cos\psi > 0 \\
a_1 &= 0, & \text{otherwise} \\
a_2 &= |g(a,b)|\cos\psi - a_1, \\
b_1 &= |g(a,b)|\sin\psi, & \text{if } \sin\psi > 0 \\
b_1 &= 0, & \text{otherwise} \\
\text{and} & \\
b_2 &= |g(a,b)|\sin\psi - b_1.
\end{aligned} \qquad (7)$$

Next, the amplitude transmittances $Ta_1$, $Ta_2$, $Tb_1$ and $Tb_2$ for pixels 32, 33, 34 and 35 in a cell (array) 31 are obtained from the complex transmittance function by the method shown in FIG. 8 (step S2).

Then, the phase distortions $\phi a_1$, $\phi a_2$, $\phi b_1$ and $\phi b_2$ of the pixels 31, 32, 33 and 34 in a cell (array) 31 are obtained from a phase distortion function $P(V, \phi)$ against the applied voltage $V_s$ shown in FIG. 5, which function has been obtained for example by fitting to a polynomial expansion. Next, a complex transmittance function $g'(a,b)$ including the phase distortion is calculated with the obtained phase distortions by using the method shown in FIG. 10 (step S3).

Then, it is decided if the difference between $g'(a,b)$ and $g(a,b)$ is sufficiently small or not (step S4). For example, it is decided if $$|g(a,b)-g'(a,b)|/|g(a,b)| \leq K: \qquad (8)$$

and K is taken for example as 0.1.

If the difference is sufficiently small, the initial $g(a,b)$ is regarded as a final value (step S5). If the difference is decided not to be sufficiently small, the obtained $g'(a,b)$ is taken as the initial $g(a,b)$ (step S6), and the flow returns to step S2 to carry out similar calculations successively.

Though not shown in FIG. 11, an appropriate weight function may be used to accelerate the conversion and to decrease $|g(a,b)-g'(a,b)|$ further.

Figure 12:
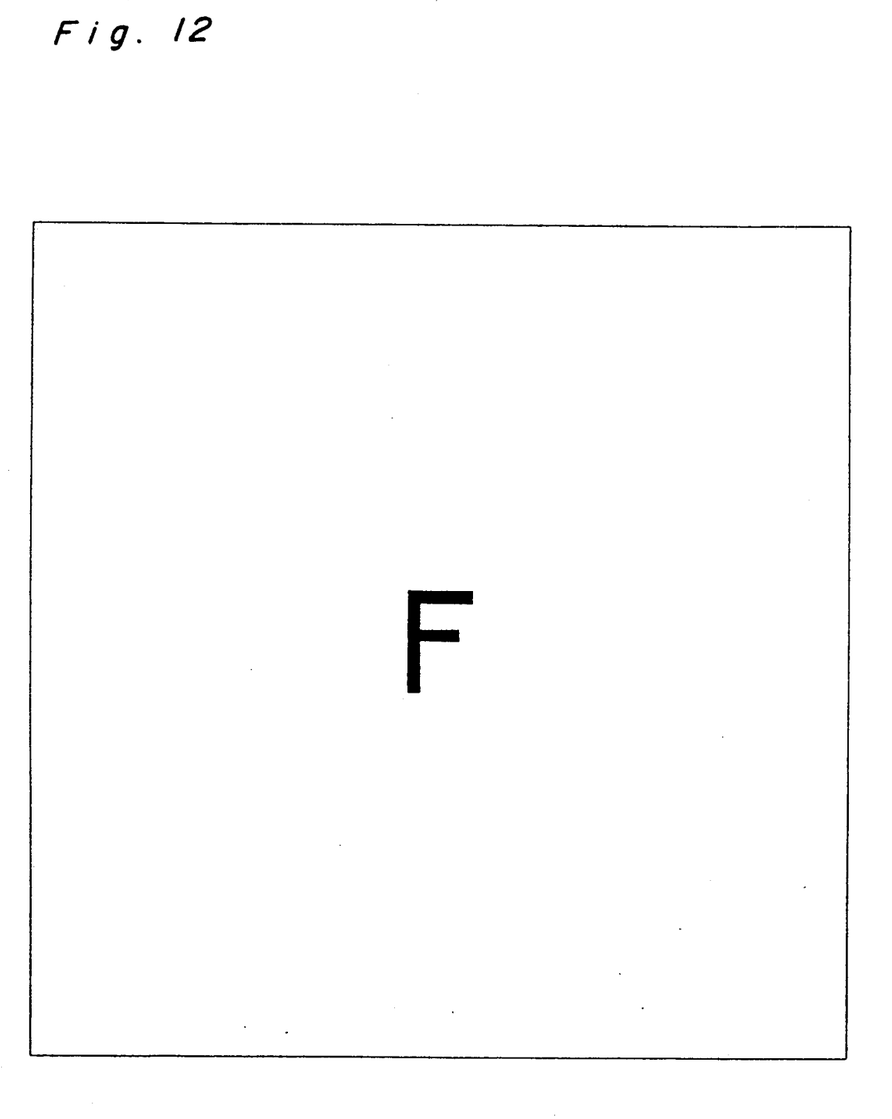
FIG. 12 is a plan view of an original figure to be reproduced by a computer generated hologram.

Next, an example of a reproduction of an image will be shown. FIG. 12 shows a desired reproduction image $G(x,y)$, that is, a character "F".

Figure 13:
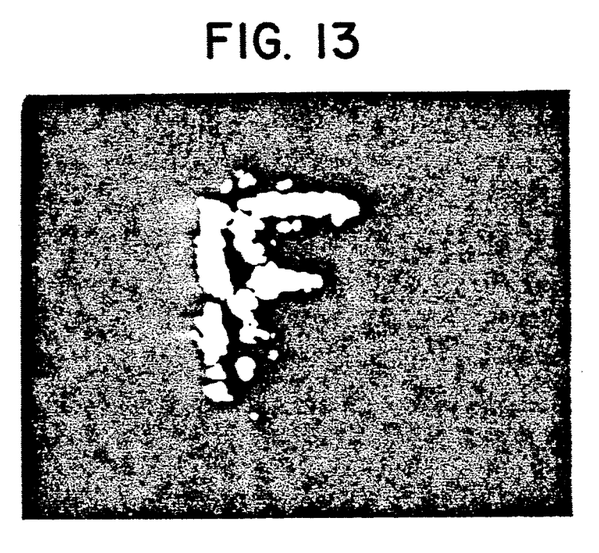
FIG. 13 is a plan view of a reproduced image of the original image of FIG. 12 without correcting the phase distortion.

When, the phase distortion is not corrected for a computer generated hologram, a distorted image is reproduced with a liquid crystal spatial light modulator 1, as shown in FIG. 13.

Figure 14:
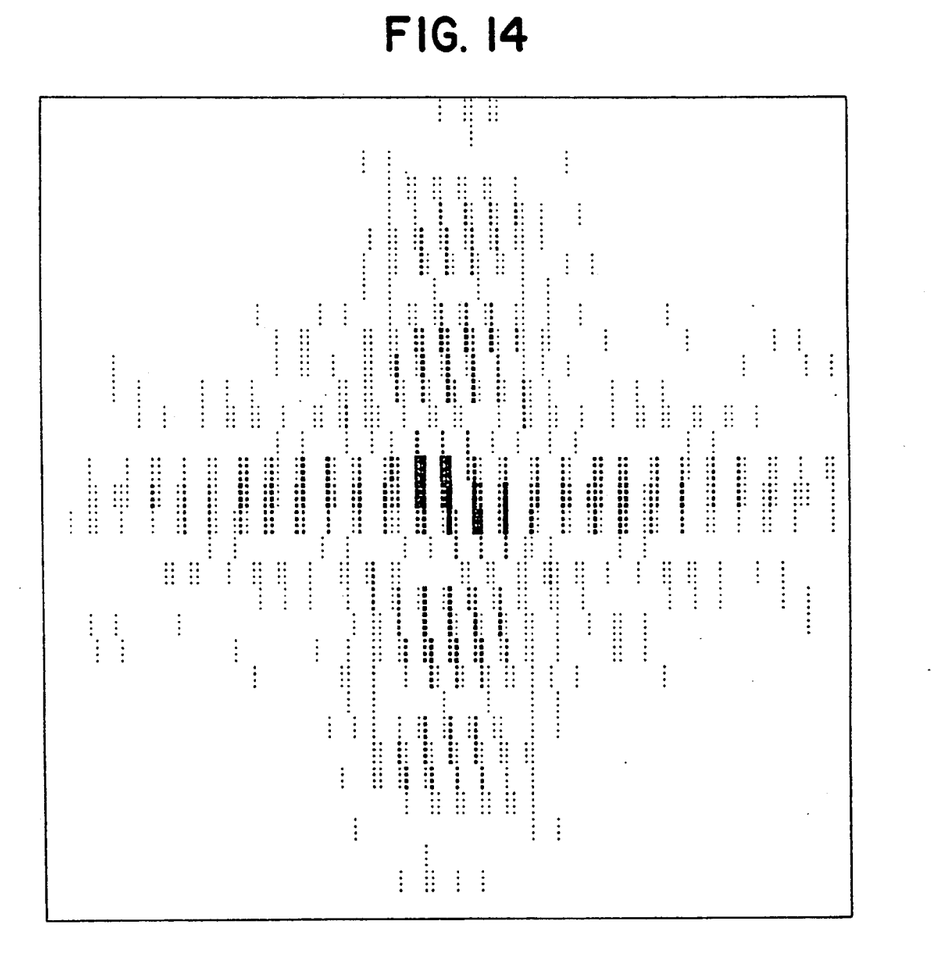
FIG. 14 is a plan view of a computer generated hologram of Example 2 of the original image of FIG. 12.
Figure 15:
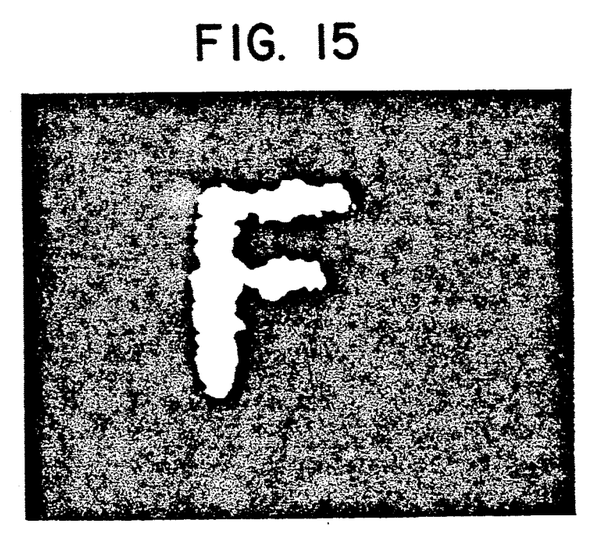
FIG. 15 is a plan view of a reproduced image with use of the computer generated hologram of FIG. 14.

FIG. 14 is a computer generated hologram wherein the phase distortion is corrected by the procedure explained above. The size of a dot displays the transmittance of a pixel. FIG. 15 is a reproduction image obtained with use of this computer generated hologram, wherein the value of K in the convergence condition (8) is set to be 0.1. It is clear that the effect of phase distortion is compensated largely.

In the examples explained above, a normally black type liquid crystal spatial light modulator is used for the display of computer generated holograms. In other words, the modulator normally shades the incident light. However, computer generated hologram for a normally white type liquid crystal spatial light modulator can be used similarly.

It is also possible to produce similarly a computer generated hologram for a reflection type liquid crystal spatial light modulator. In this case, the phase distortion due to the reflecting light is taken into account. For example, in a method explained in Example 2, the reflectance is used instead of transmittance.

It is understood that various other modifications will be apparent to and can be readily made by those skilled in the art without departing from the scope and spirit of the present invention Accordingly, it is nor intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A method for producing a computer generated hologram to be used for a liquid crystal spatial light modulator having a plurality of pixels to be controlled to open completely or to close completely, wherein a cell being composed of a plurality of pixels is a unit for displaying the amplitude component and the phase component of a coherent wave disturbance, and a cell may have an aperture composed of pixels adjacent to each other to express the amplitude and phase components, said amplitude component for a cell being expressed by the area of the aperture, said phase component being expressed by the distance of the aperture from the center of the cell, comprising the steps of:
   (a) calculating the amplitude component and the phase component for each cell;
   (b) adding the phase distortion component to said phase component by using experimental data of phase distortion of a pixel; and
   (c) determining the center of the aperture in each cell according to the result of said adding step and the area of the aperture according to said amplitude component.

2. A computer generated hologram to be used for a liquid crystal spatial light modulator having a plurality of pixels to be controlled to change the transmittance of liquid crystal layer to express gradation, wherein a cell being composed of a linear array of pixels is a unit for displaying the amplitude component and the phase component of a coherent wave disturbance, said phase component being expressed as the position of a pixel assigned to the phase in said linear array of pixels, said amplitude component in correspondence with said phase component being expressed as the amount of transmitted light in said pixel assigned to the phase, comprising the steps of:
   (a) calculating the amplitude component and the phase component in a cell;
   (b) estimating the phase distortion in each cell according to the amplitude component data obtained in the calculating step by using experimental data of phase distortion of a pixel; and
   (c) correcting the amplitude component and the phase component by adding the phase distortion to the phase component.

* * * * *